United States Patent [19]

Kolb et al.

[11] 4,205,564

[45] Jun. 3, 1980

[54] METHOD OF MAKING CARBIDE-TIPPED TOOLS

[75] Inventors: Gerhard G. Kolb, Chicago, Ill.; Heinrich E. Tauscher, Furth-Oberalteich, Fed. Rep. of Germany

[73] Assignee: Unicut Corporation, Chicago, Ill.

[21] Appl. No.: 915,909

[22] Filed: Jun. 16, 1978

[51] Int. Cl.² ............................................. B23D 63/00
[52] U.S. Cl. ..................................................... 76/112
[58] Field of Search ............ 76/112, 25, 101 A, 101 R; 219/77, 152

[56] References Cited

U.S. PATENT DOCUMENTS

| | | | |
|---|---|---|---|
| 2,474,643 | 6/1949 | Webb | 76/101 A |
| 3,034,378 | 5/1962 | Anderson | 76/112 |
| 3,295,396 | 1/1967 | Kolb | 76/112 |
| 3,800,633 | 4/1974 | Funakubo | 76/112 |
| 4,061,057 | 12/1977 | Gray | 76/112 |

Primary Examiner—Othell M. Simpson
Assistant Examiner—Roscoe V. Parker
Attorney, Agent, or Firm—Laff, Whitesel & Rockman

[57] ABSTRACT

The invention provides a method of attaching carbide inserts to the tips of steel saw blades, and other tools. The manufacturing steps include (a) forming a band of discrete carbide inserts attached, in one embodiment, to a foil ribbon of brazing material, (b) holding the insert against the steel saw blade tooth, (c) heating the junction between the insert and steel to melt the brazing material, and (d) forcing the insert into a self-formed seat in the plastic steel. In some embodiments, the foil of brazing material is used primarily for holding, supporting and feeding the carbide inserts to the welding head. The brazing material is primarily vaporized by the welding heat so that little or none of it remains in the weld at the interface between the carbide inset and the steel of the saw blade. This forms a bond which has some attributes of both welding and brazing at a very strong mechanical joint.

11 Claims, 8 Drawing Figures

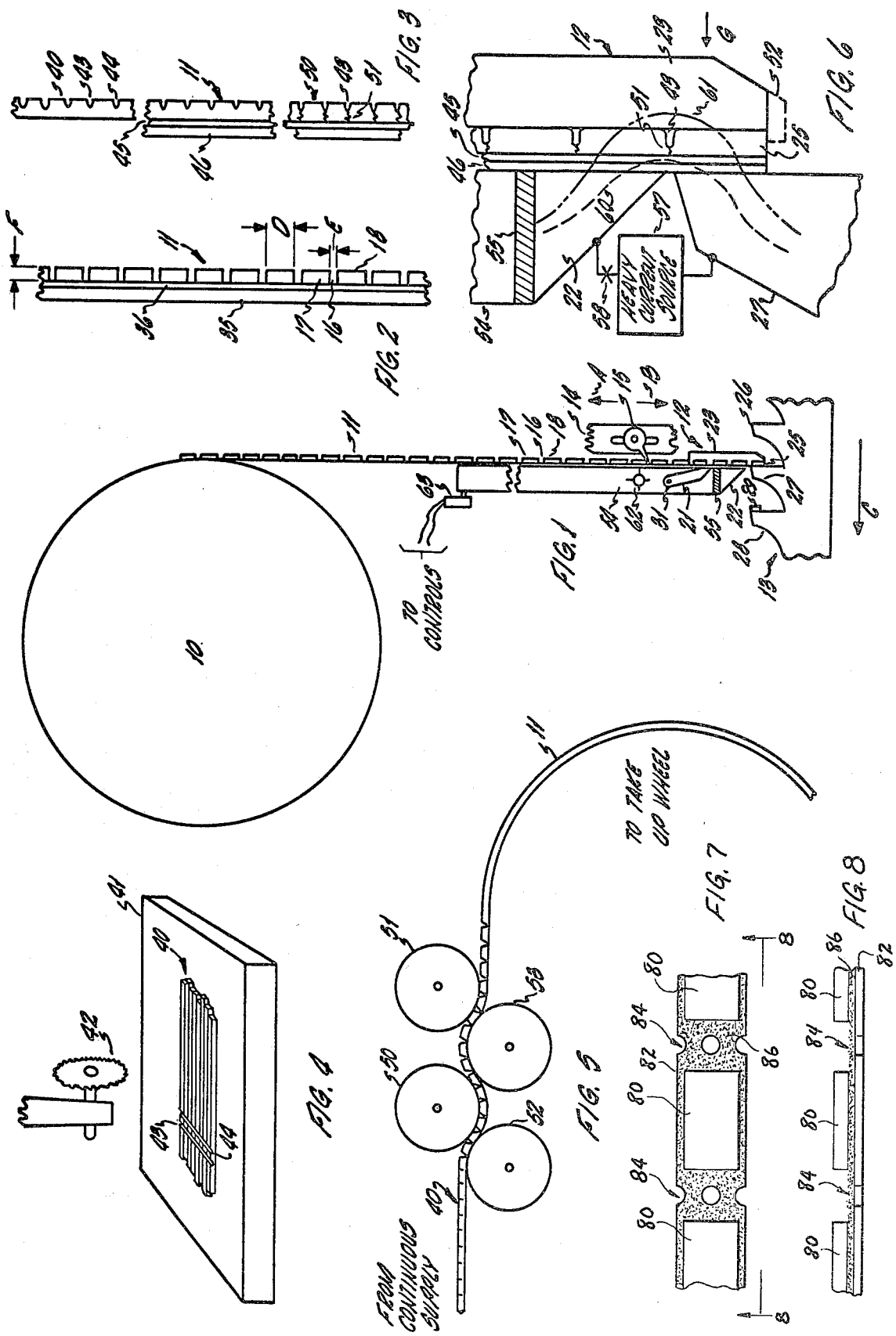

METHOD OF MAKING CARBIDE-TIPPED TOOLS

Reference is made to our previous application Ser. No. 791,574, filed Jan. 16, 1969, now abandoned, which discloses substantially the same invention which is disclosed herein.

This invention relates to means for and methods of making carbide-tipped tools generally and more particularly to methods of making small tipped tools, such as saw blades, for example.

There are a number of known methods of applying carbide tips to cutting tools. However, each method suffers from certain problems and defects. For example, one method requires a slow, time-taking work cycle of: (a) feeding a carbide rod into a touching contact with a steel tooth, (b) welding an end of the carbide rod to the steel tooth, and (c) cutting off the carbide rod near the steel and carbide weld. This painstakingly slow work cycle must be repeated at every tooth of a saw blade. Another method is much faster, but it requires the steps of: (a) feeding a carbide rod into a touching contact with a steel tooth, (b) welding the carbide rod to the steel tooth, and (c) bending the carbide rod to break it off near the end of the steel tooth. The breaking of the rod often damages the weld and increases the probability of failure during a normal product lifetime. Yet another method requires a pre-shaping of a socket in the tooth of a steel saw blade to receive a uniquely shaped carbide insert. This method required expensive machinery for handling small parts.

The currently used welding techniques lead to more basic problems which inherently limit the nature of the end product tool. For example, the excessive heating of a carbide or steel material causes internal stresses within the material, which tend to make the material fail under use. More particularly, as a metal is heated to high temperatures, and then cooled quickly, the metal tends to freeze in an internally stressed condition. Annealing is the process used to relax these stresses somewhat and to make the metal usable. If the carbide rod is broken or cut while in the highly stressed condition (i.e., before annealing), it is somewhat like cutting a stretched rubberband and trying to predict how the ends of the band may whip about. There is no way of predicting how the internal metallic structure may react as the stresses tend to snap. Hence, the entire manufacturing process becomes marginal, with no apparent way of improving production by insuring that the metal stresses will react in a predictable manner.

Also, despite some statements to the contrary, the existing carbide-to-steel attachment techniques are very often limited as to the types of material which may be used. Thus, in the very small space found on the teeth of a band saw, existing techniques inherently limit the welding to only a few kinds of carbides which are easy to weld to steel. This, in turn, prevents the manufacture of saw blades which are suitable for many specialty uses required other kinds of carbides.

Accordingly, an object of the invention is to provide new and improved means for and methods of applying carbide tips to a great variety of steel tools. Another object is to apply such carbide tips to very small steel parts, such as the teeth of band saw blades. Here, an object is to apply any one of many different kinds of carbide tips to such teeth on a steel saw blade.

Another object of the invention is to accomplish the above-stated objects in a new and more reliable manner. Here an object is to attach the carbide tips without subjecting them to mechanical stresses during a welding process. A further object is to avoid severe mechanical working immediately after the welding is completed. Yet another object is to provide a manufacturing technique which gives readily predictable results.

Yet another object of the invention is to make a maximum use of general purpose manufacturing tools. Here an object is to provide an extremely flexible production line which is readily adaptable to the production of any of many different tools.

In keeping with an aspect of the invention, these and other objects are accomplished by providing a coil or band of discrete carbide inserts which may be fed to a tool for holding the insert against a steel saw tooth. The band or coil comprises a foil ribbon strip of brazing material which is interposed between the carbide and steel tooth. Then, heat is applied to the junction between one of the inserts and an individual saw tooth. This heat melts the brazing material and brings the steel to a state which is someplace between a plastic state and a flowing state while the insert is being pressed into the tooth. Hence, the insert is brazed into a custom-formed seat in the steel. This way, both a brazing and a mechanical bond is formed between each of the steel teeth and the carbide inserts. In some embodiments, the volume of the brazing material is reduced to a degree that virtually no brazing material remains in the weld. Here, the foil of brazing material is used primarily as a backing foil for holding and manipulating the inserts. Brazing material is preferred, because any residue of brazing material which remains will not contaminate the interface between the insert and steel. Thereafter, the insert may be shaped or sharpened in any known manner.

The nature of equipment for accomplishing the foregoing and other objects may be understood best from the following description, when taken in conjunction with the attached drawings, in which:

FIG. 1 schematically shows a carbide insert machine for carrying out the invention;

FIG. 2 shows a coil or band of carbide inserts which may be used in the machine of FIG. 1, in order to practice the invention;

FIG. 3 shows an alternative to the coil or band of inserts shown in FIG. 2;

FIG. 4 schematically shows the first step in one method of preparing the coil or band of FIG. 3;

FIG. 5 schematically shows a second step for converting the rod prepared in FIG. 4 into a coil or band of inserts for use in the machine of FIG. 1;

FIG. 6 shows a large-scale view of the heating tip (taken from FIG. 1).

FIG. 7 is a top plan view of another embodiment using a plastic ribbon of pressure-sensitive adhesive to hold the inserts in place; and FIG. 8 is a side elevation view of the embodiment of FIG. 7.

In the description which follows, it is convenient and expedient to use certain terms in order to facilitate the description. However, this particular selection of terms is not to be construed as unduly limiting upon the invention. For example, the term "coil" or "band" of carbide inserts implies any convenient shape. The band could be a long, straight piece, a spiral coil, or a simple free form. The term "discrete insert" is intended to cover both inserts which are completely separated from each other and a rod which is sawed or notched almost completely through, but a small bridge of material is retained at the bottom of the notch to facilitate handling. The "heating tip" and the amount of heat generated at the tip are described in terms of function and accomplishment. As long as these functions are accomplished, there is no need to be unduly specific as to whether the tip or the heat causes a welding or a brazing bond. The resulting bond of fused metals has some attributes of each. Finally, certain conveniences of manufacture are described herein, such as passing a rod of notched carbide material through rollers; however, other manufacture techniques may prove equally satisfactory. Those who are skilled in the art will readily perceive still other terms which should be construed broadly.

FIG. 1 shows a supply reel 10 carrying a coil or band (hereinafter a "band") 11 of discrete carbide inserts. The band is led in any suitable manner to the heating tip 12 of a machine tool. A steel saw blank 13 is moved a tooth at a time adjacent the heating tip 12 in order to have one of the carbide inserts attached to each tooth. The nature of the supply 10 is not too important. It is contemplated that the band 11 of carbide inserts may be wound as a spiral on a large spool rotatably mounted inside a cover. Ideally, the band is made as long as possible, considering the convenience of handling, so that the labor of filling or replacing the supply 10 is reduced to a minimum. The band of carbide inserts 11 is drawn from the supply 10 and trained over any convenient number of pulleys or other guide members (not shown). In this manner, the band is led over the guides to the heating tip 12.

The guiding structure includes a suitable insert band feed length control means. As best shown in FIG. 1, this control means is a reciprocal motion feed device 14 adapted to move up and down in the directions A or B. Included in this device is a pawl 15 which engages successive separation spaces between the discrete carbide inserts (for example, space 16 is between the inserts 17,18). Thus, each time that the reciprocal feed device 14 moves up in direction A, the pawl 15 drops into the next separation space. Then, when the feed device next moves downwardly in the direction B, the pawl 15 pushes the insert band 11 downwardly over the length of one stroke of the reciprocal device 14. This brings the next discrete carbide insert into position adjacent the heating tip 12 and saw tooth. Of course, the feed means could also take other forms. For example, the heating tip 12 may be provided with a simple stop 19 (as shown in FIG. 6) which allows the insert band 11 to move a predetermined distance—and no further—on each feed step.

The insert band 11 is then clamped in place during the heating step. As here shown, the band is led by a clamp 21 which pulls a movable tip electrode 22 into a locked position against a stationary electrode 23. Another clamp (not shown) may lock the band and insert into position by acting at right angles to the clamp 21-23 seen in FIGS. 1 and 6. The band 11 is then rocked in position betwen the tip electrodes 22,23. Hence, the feed cycle is: (a) move the reciprocal feed member 14 upwardly in the direction A; the pawl 15 drops into the next separation or span between the inserts, (b) unlock the clamp 21 and open the movable tip electrode 22, (c) move the reciprocal member 14 downwardly in the direction B, so that insert 25 comes to the work position, and (d) close the clamp 21 into the locked position. The insert 25 is now ready to be attached to the saw blade 13.

The blank saw blade is also advanced a step at a time to receive a carbide insert on the tip of every tooth. More particularly, the saw blade 13 is a preformed blank having teeth 26-28 of any convenient size and shape. Any suitable means are arranged to advance and support the blade, which moves in the direction C, a tooth at a time. As here shown, the tooth 26 is the next to be presented to the heating tip 12. The tooth 27 is standing in a working contact with the heating tip 12 which is holding the discrete carbide insert 25 under pressure against the tooth. The tooth 28 already has the carbide insert 29 attached thereto. This attachment occurred during the work cycle immediately before the cycle shown in FIG. 1.

The nature of the band 11 of inserts is explained with the help of FIGS. 2-5. Each insert, such as 17, is preformed to have the approximate dimensions of the desired tip for the particular saw blade that is being manufactured. These dimensions will vary from saw type to saw type, and perhaps within the same type of saw, also depending upon the work which the saw is supposed do. However, to give a specific example so that the invention may be better understood, the insert length dimension D might be in the order of 0.1 to 0.05 inches. The separation spaces E between the inserts might be a few thousandths of an inch wide. The insert thickness F could be about 0.01 to 0.03 inches. The insert width dimension (not seen in FIG. 2) could be about two-thirds of the length dimension D.

The carbide material is no longer dependent upon the interface characteristic between the saw and insert. Therefore, almost any available kind of carbide material may be used for the inserts. Again, to provide a specific example, the inserts for one saw were made from an alloy of the group type having an industry code designation "C5" (Kenna-metal KM). The content of this alloy might be in the order of approximately 10% cobalt, 5% tantalum, 3-4% titanimum, and the remainder tungsten.

The carbide inserts, such as 17, are fastened to a foil ribbon of brazing material by any suitable binding material 36. The brazing material 35 is a high-temperature melting material, such as Braze 852 sold by the Handy and Harman Company of New York, N.Y. The specifications published by this company describes Braze 852 as being 85% silver and 15% manganese, melting at 1760° F. and flowing at 1780° F. The binder material 36 is a low temperature melting material, such as Easy-Flo-3 also sold by Handy and Harman. This material has been described in sales literature as 50% silver, 15½% copper, 15½% zinc, 16% cadmium, and 3% nickel, melting at 1170° F. and flowing at 1270° F. The thickness and composition of the foil 35 also varies with the size of the insert and steel tooth and with the nature of the insert material. When the insert has a high cobalt content, the foil might be 0.001 to 0.003 inches thick. When there is a low cobalt content or a high titanimum content, the foil may be 0.005 to 0.01 inches thick.

Depending upon the particular carbide material being used, it may be initially plated with a material (such as copper or cadmium) which will better stick to the binding material 36. In other materials, a plating layer of silver alloy may be used in place of the copper plating. Sometimes, known two- and three-layer brazing foils (such as a sandwich of silver-copper-silver may also be used, but they are undesirably heavy when the inserts have very small dimensions, such as those set forth above.

The principle of a preferred embodiment is, therefore, that the inserts 17 are first plated with a material which sticks to the binder metal 36. Then, the plated inserts are attached at 36 to a foil ribbon 35 of brazing material, the flow point of the material 36 is much lower than the melting point of the ribbon 35. The ribbon melts (and preferably tends to vaporize) before the steel of the saw blade reaches the temperature which makes it suitable for forming a socket or seat. The carbide material of the insert may heat to a light red color, but it does not change its physical state in any appreciable way responsive to the temperature which makes the steel of the saw blade fluidly plastic. As long as these conditions are met, known brazing techniques and materials may be used according to known principles. For example, the foil ribbon 36 could be plated with a binder material, as a first manufacturing step. Or, the carbide inserts could be welded to the foil by a spot-welding technique. However, this spot-welding technique is a specialized process which is normally restricted to certaion kinds of carbides, such as high cobalt alloys.

There are a number of different techniques for selectively orienting the discrete inserts with respect to the brazing foil. For example, the discrete carbide inserts may be formed initially and then placed on the foil by an automatic machine fed from a vibration separator. However, this type of machine for positioning the small inserts requires a relatively high initial capital outlay which is justified in large quantity mass production lines. Very often, a more flexible approach is desired for most operations.

FIG. 3 shows three fragments of band 11, taken at successive steps in the process of making the band of discrete inserts. These steps provide a low-cost, flexible manufacturing process, which is well-adapted to the use of a wide variety of carbide materials. In greater detail, a long rod 40 of any suitable carbide material is first cut to have a number of deep notches at the ends of each desired insert length.

FIG. 4 shows one way of doing this. A number of side-by-side rods 40 are attached to a table 41 in any known manner. In one exemplary production line, these rods 40 are attached to the table 41 by means of cellophane tape having a pressure-sensitive adhesive on both sides. Then, a radial arm saw 42, or other suitable cutting device, is drawn across all of the rods to cut a deep notch 43 in each. Next, either the table 41 or the saw 42 is moved one step (e.g., the table is moved to the left, as viewed in FIG. 4) and then the cutting edge of saw 42 is again passed over the rods 40 to cut a second deep notch 44 in each rod. In like manner, the step-by-step notching cuts are repeated periodically until all of the rods 40 are notched over substantially their entire length. The rods 40 may then be removed from the table 41 and plated or otherwise adapted according to known brazing and soldering requirements. Then, each of the rods 40 is bound at 45 (FIG. 3) to the foil ribbon brazing material 46. Thus, the sandwich of high temperature foil, low temperature binder, and carbide inserts is formed while all of the inserts are interconnected and easy to handle. The next step depends upon the nature of the inserts being used to make the saw. The small bridge of material remaining between the inserts is very weak if the teeth and inserts are very small, the foil is thin, and the notches 43,44 are made very deep. Thus, the rod 40 is not broken before the inserts are welded to the saw, but it remains unbroken so that the rod is rigid enough for easy handling. Yet, the bridges between the inserts are so weak that they may be easily broken apart after welding, without imposing any stresses upon the fused junction. Moreover, since the deep notches are cut before the brazing material is applied to the insert, the stresses, if any, are contained within the insert itself, and they do not snap to any significant degree when the rod is broken at the weakened bridge. Hence, there is no unpredictability when the stresses are broken.

If the teeth and inserts are larger, reaching sizes were the bridges between the inserts are stronger, it may become desirable to separate the inserts more completely before the welding step. The foil of brazing material 46 also becomes strong enough, in these larger sizes, to support the individual inserts. After the sandwich 40,45,46 is formed, the rod 40 is run through a series of rollers 50–53 (FIG. 5) which bend the rod with sufficient force to break it into completely separated, individual, discrete carbide inserts. As shown in FIG. 3, each notch 43 in the rod 50 forms a weakened area where the rod breaks, as at 51, when it is rolled as shown in FIG. 5. Since carbide is a very brittle material, it breaks very easily into the individual inserts. The brazing foil 46 is malleable, and it does not break. Hence, after having passed through the rollers 50–53, the rod 40 becomes a flexible band 11 of completely separated, discrete inserts.

The operation of the inventive process may be understood best from a study of FIG. 6—an enlarged view of the heating tip 12. First, the clamp 21 opens to move the tip 22 away from the stationary tip 23. Then, the reciprocal member 14 moves up so that pawl 15 engages the next separating space. Thereafter, the member 14 moves down one step where the insert 25 abuts against a stop 19, if provided. Next, the clamp 21 is closed and the movable tip 22 is locked against the stationary tip 23. Another clamp may also be arranged to hold the insert at right angles to the clamp shown in FIG. 6. The insert 25 is pushed against tooth 27 by a force G.

Heat is applied, by any suitable means, to the junction between the insert and steel saw tooth. The heating could be applied by either a torch or a heavy electrical current. In an electrical current is used, the tip 12, ribbon 11, supply 10, and all other parts are suitably insulated so that the least number of parts are raised to the electrical potential of the heating power supply. Since the heating voltage is very low (say, 1–3 volts), it is relatively easy to provide this insulation. For example, almost any electrical insulation tape may be used; or, an insulation material may be sprayed on. By way of example, one bit of this insulation is shown at 55.

When contacts 58 close, a source 57 of heavy electrical current is connected between the saw tooth 27 and the movable tip electrode 22. Immediately, a current represented by the dotted line 60 flows from tip 22 to tooth 27 through the path of least resistance, which is the high and low temperature brazing foil 46,45. Almost immediately, the brazing material melts in the high resistance area adjacent the break 51, thus leaving the insert 25 completely separated from the band 11. The melted foil causes the current to shift to a path through the stationary tip electrode 23, as shown by the dot-dashed line 61.

The current continues to flow, melting the ribbon of brazing foil 46 according to known principles of the brazing art. Preferably, the temperature is sufficient to virtually vaporize the foil. The steel in the tooth 27 continues to heat until it becomes plastic enough to form a seat for the insert—this will be less than the temperature at which steel begins to flow, however. The tip 23 has a heavy heat sink characteristic; thus, there is almost no heating reaction between it and insert 25. The carbide insert 25 heats until it becomes light red in color, but it does not change its physical characteristics; therefore, it remains hard and displaces some of the plastic steel. This forms a custom-made socket in the steel tooth for receiving and supporting the insert 25. As the insert 25 moves into the socket which it forms, the support arm 54 swings about the pivot point 62 (FIG. 1) thereby operating a microswitch 63 to open contacts 58. This terminates the flow of the heavy current from the source 57. The microswitch 63 may also initiate the next step in the work cycle of the production machine.

FIGS. 7 and 8 show another embodiment of the invention wherein a plurality of the carbide inserts 80 are held in place by means of a ribbon 82 of plastic tape having a pressure sensitive adhesive. The ribbon between the inserts, at 84, is notched and perforated at 84 to reduce to a minimum the amount of the plastic ribbon which must be burned away during the welding process. The only requirement is that the plastic at the perforations shall be strong enough to support and transport the inserts.

The drawing is stippled at 86 to indicate pressure-sensitive adhesive used to secure the inserts in place. Preferably, the adhesive is an electrically conductive material so that it carries the heavy welding current 60 (FIG. 6). For example, the adhesive may be loaded with conductive metal powder.

The principle is that the plastic ribbon and adhesive shall melt and burn away, with virtually no ash remaining thereafter at the interface between the tooth and insert. The conductive powder 86, which remains at the interface after the tooth is brazed or welded in place, is a brazing material which contributes to the strength of the bond.

The description is of preferred embodiments of the invention for making carbide-tipped saw blades. It should be understood, however, that the same principles may also be used to make other tools, such as circular saw blades, chisels, and the like. Moreover, the heat cycle may be adapted to come on with a slow rising, pre-heat warm-up, then raise quickly to a heavy current for melting the foil, or other supporting material, making the steel plastic enough to form the insert socket, and finally falling off slowly with an annealing cooling. The brazing material must melt quickly enough to prevent the alloy from separating into its elemental components. Furthermore, the heating may be accomplished under a controlled atmosphere, such as nitrogen. Still other known welding and brazing techniques may be used.

From a study of the foregoing description, those who are skilled in the art will readily perceive modifications which may be made without departing from the spirit and scope of the invention. Accordingly, the attached claims are to be construed broadly enough to cover all equivalents falling within the teachings of the invention.

We claim:

1. A method of manufacturing carbide tip tools comprising the steps of:
    a. applying a carbide insert under pressure to a steel blank with brazing material between the carbide and steel at the time of application, and
    b. heating the junction between said insert and steel until said brazing material melts and said steel becomes plastic whereby said pressure pushes said carbide insert to form a socket seat for itself in said plastic steel.

2. The method of claim 1 wherein said step a. further comprises the further steps of:
    (1) preforming said carbide inserts into a flexible band of elements attached to a ribbon including said brazing material in sufficient quantity to carry an initial welding current,
    (2) preforming said steel into a saw blank having a number of teeth thereon,
    (3) advancing said saw blank and said band of discrete elements a step at a time whereby each insert is successively presented to each successive saw tooth, and thereafter applying the heat of step b.

3. The method of claim 2 wherein step b. further comprises the steps of:
    (1) applying a current for melting the brazing material between the insert presented to a saw tooth, and
    (2) holding the insert against the tooth with an electrode which conducts said current after said brazing material melts.

4. The method of claim 2 wherein each of said insert elements is completely separated from adjacent insert elements before step a.(3).

5. The method of claim 4 wherein said inserts are presented one at a time to each successive ones of the saw teeth.

6. A method of manufacturing a carbide-tipped tool comprising the steps of:
    a. providing a flexible band of carbide inserts mounted on a ribbon having a brazing material, as a part thereof,
    b. feeding the band of inserts to a heating tip with the brazing material positioned between each of the inserts and another material that is to be integrally joined to the insert, and
    c. heating the junction between the insert and said other material while applying a pressure urging the insert against said other material, said heat raising said junction to a temperature which brings said other material to a plastic state and melts said brazing material so that said junction becomes a custom-made seat for the insert with a brazing material between the insert and the seat.

7. The method of claim 6 wherein said step c. comprises the further steps of:
    (1) applying said heat responsive to a heavy current with a slow-rising pre-heat cycle,
    (2) raising said current quickly enough to melt said brazing material without allowing the brazing material to separate into its elemental components and to heat said other material to a plastic state, and
    (3) lowering said current slowly to anneal said junction, carbide insert, and other material.

8. The method of claim 6 wherein said brazing material is foil and said step a. comprises the further steps of:
    (1) periodically notching a carbide rod at fixed distances along the length thereof to form insert size members,
    (2) attaching said rod to said brazing foil, and
    (3) breaking said rod at each of said notches without breaking said foil in order to form said flexible band of inserts.

9. The method of claim 6 wherein said step a. comprises the further steps of:

(1) plating said carbide inserts with a material which will stick to a low temperature binding material, and
(2) attaching said carbide inserts to said foil via said low temperature binding material.

10. The method of claim 6 wherein said brazing material comprises a flexible plastic ribbon having thereon a pressure sensitive adhesive loaded with a conductive powder in sufficient quantity to initially conduct a welding current before the plastic ribbon melts.

11. The method of claim 10 wherein said plastic ribbon is perforated between the inserts in order to reduce the amount of ash and residue remaining after the plastic melts.

* * * * *